May 2, 1950 — R. P. HUMPHREY — 2,505,966
CORN POPPER
Filed Feb. 17, 1947
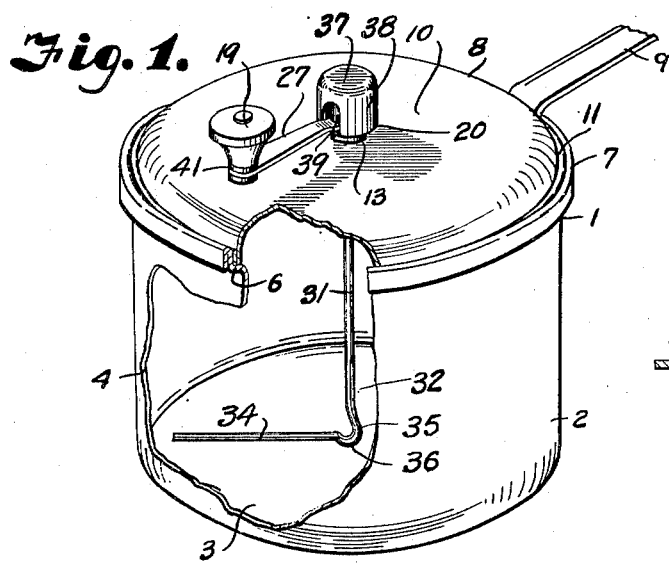
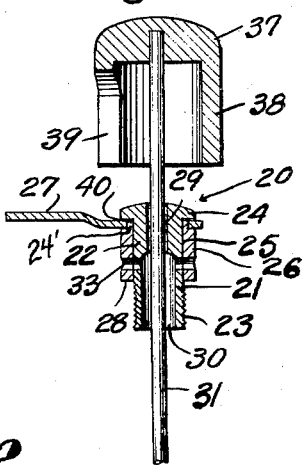
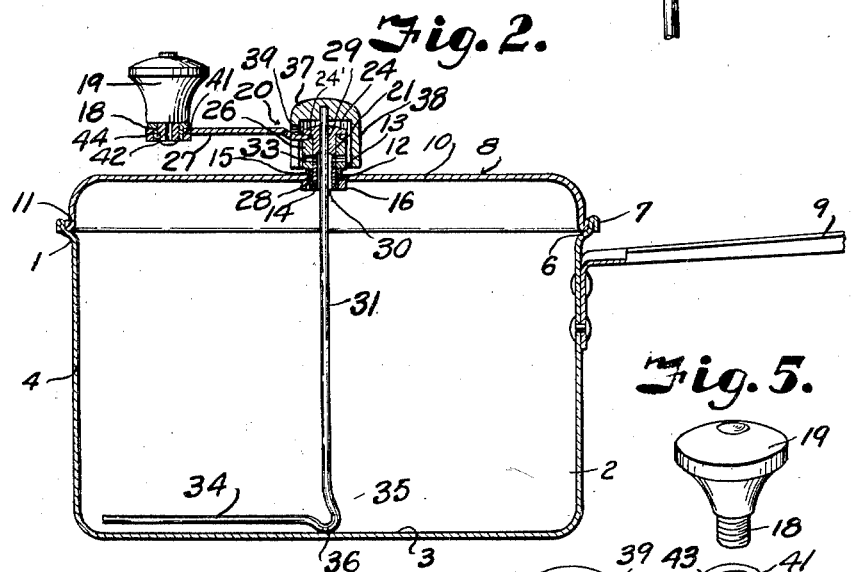
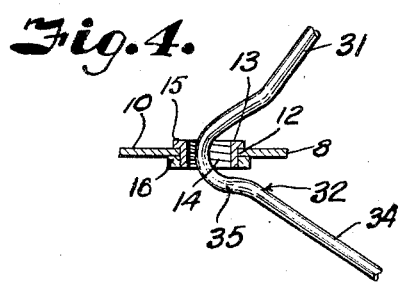
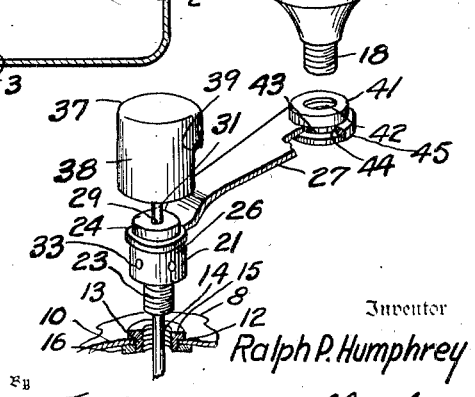
Inventor
Ralph P. Humphrey
By Fishburn & Mullendore
Attorneys Patented May 2, 1950

2,505,966

UNITED STATES PATENT OFFICE 2,505,966

CORN POPPER

Ralph P. Humphrey, Liberty, Mo.

Application February 17, 1947, Serial No. 729,095

4 Claims. (Cl. 259—108)

This invention relates to corn-poppers, particularly those of the type which include a saucepan-shaped vessel equipped with a lid carrying the stirring mechanism, and has for its principal object to provide a structure of this character wherein the stirring mechanism is readily removed to permit use of the vessel as a conventional saucepan for any household purpose.

It is also an object of the invention to provide a construction wherein the lid freely retains its seat on the vessel and there is no raising, cocking, or rolling out of the lid incidental to operation of the stirring mechanism; consequently, no screws or clamps are necessary in holding the lid on the vessel.

Other objects of the invention are to provide a stirring mechanism having a crank rotatably mounted on the lid and which is connected with a stirring rod to permit self-adjustment of the stirring rod relative to the crank; to provide a knob for the crank that is adapted to be removed and mounted on the lid when the stirring rod is removed therefrom; to provide a structure wherein the stirring rod is kept in rotative contact with the bottom of the vessel by a weight which also forms the driving connection between the crank and stirring rod; and to provide the stirring rod and crank supporting bearing member with vents for releasing vapors from the vessel.

Other objects of the invention are to provide a cover and stirrer unit which is applicable to any conventional vessel of the saucepan type; and to provide a unit assembly which reduces the possibility of misplacing the parts when the stirrer mechanism is removed from the lid.

In accomplishing these and other objects of the invention hereinafter pointed out, I have provided improved structure, the preferred form of which is illustrated in the accompanying drawing wherein:

Fig. 1 is a perspective view of a corn-popper embodying the features of the present invention, a portion of the vessel and lid therefor being broken away to better illustrate the stirring rod.

Fig. 2 is a vertical central section through the corn-popper.

Fig. 3 is an enlarged section through the stirring rod and crank bearing, the stirring rod being in raised condition and disconnected from driven engagement with the crank.

Fig. 4 is a fragmentary section illustrating removal of the stirring rod through the bushing of the lid.

Fig. 5 is a perspective view of the upper portion of the stirring rod bearing and crank, the bearing being shown removed from the lid of the vessel, the stirring rod in raised position, and the knob as removed from the crank arm.

Referring more in detail to the drawings:

1 designates a corn-popper constructed in accordance with the present invention and which includes a vessel 2 of the shape of a conventional saucepan and having a substantially flat bottom 3 and a cylindrical wall 4. The rim of the wall is shaped to provide an outwardly extending annular shoulder 6 encircled by a flange 7 to seat and retain a lid or cover 8. The wall of the vessel carries a handle 9 that may be suitably attached thereto so that the vessel may be carried or supported in the hand. The lid or cover 8 illustrated in the drawing is of somewhat dome shape having a relatively flat top 10 rounding downwardly at its periphery to terminate in a bead 11 that is adapted to seat upon the shoulder 6 and be retained by the flange 7.

Formed in the axial center of the lid is an opening 12 in which is mounted a bushing 13 having an internally threaded axial opening 14. The bushing has a laterally extending annular flange 15 engaging the outer face of the lid and is retained in fixed position by a washer 16 that is pressed thereon and which engages the inner face of the lid with sufficient tightness to prevent turning of the bushing. The threaded opening 14 of the bushing ordinarily mounts the threaded shank 18 of a knob 19.

When the vessel is to be used as a popcorn popper the invention contemplates removal of the knob, and application to the lid of a stirring mechanism 20 including a bearing member or journal 21 which has a cylindrical body 22 threaded at one end as at 23 and provided with a circumferential flange 24 at the other. The threads 23 conform with the threads of the bushing 13 so that the bearing member is adapted to be mounted on the lid by turning the lid upon the threaded portion of the bearing member. The threads 23 terminate short of the flange 24 to provide a smooth periphery 25 for mounting a collar 26 that is pressed thereon and has a reduced end abutting against the flange 24 to form a bearing surface between a shoulder 24' on the collar and the flange 24 and which retains a crank 27. The collar 26 also forms a stop shoulder 28 which engages the flange 15 of the bushing 13 to lock frictionally the bearing member therein. The bearing member has an axial bore 29 extending through the flanged end and a counterbore 30 opening from the threaded end, the bore 29 forming a bearing for the shaft 31 of a stirring rod 32 and the counterbore 30 a passageway around the shaft and which connects with radial ports 33 opening exteriorly of the vessel for venting vapors.

The shaft 31 extends downwardly into the vessel and terminates in a laterally direct agitator arm 34. The junction between the shaft 31 and arm 34 is formed on a curve 35 as shown, to facilitate insertion and removal of the agitator through the opening of the bushing 13. The curved portion of the rod also provides a point bearing contact 36 with the bottom of the vessel so that the agitator arm 34 is supported slightly thereabove and in position to engage the kernels of corn when the popper is being used. The shaft 31 projects upwardly from the bearing member 21 and mounts a weight 37 having an annularly depending skirt portion 38 which passes loosely over the bearing member and collar 26. One side of the skirt portion is provided with an elongated slot 39 for accommodating the crank 27 and which provides a connection between the crank and the stirring rod. The weight is sufficient to hold the stirring rod in contact with the bottom of the vessel and the connection thereof with the crank compensates for variations in depth of the vessel or irregularities in the bottom thereof. The crank 27 has an opening 40 in the end thereof which accommodates the bearing portion of collar 26 so that the crank is rotatable freely thereon. The opposite end of the crank carries a bushing 41 having internal threads 42 corresponding with the threaded shank 18 previously described. The bushing 42 has a reduced portion 43 extending through an opening 44 in the free end of the crank and which mounts a washer 45 that is pressed thereon cooperated with a knurled peripheral flange 46 of the bushing to rotatably retain the bushing in the opening of the crank.

When the vessel 2 is used as a saucepan the knob 19 is threaded into the bushing 13 of the lid 8. This may be readily effected by holding the knob 19 and registering the threaded shank 18 with the opening 14 in the bushing and then spinning the lid 8 onto the shank until the knob engages the flange 15 of the bushing.

When the vessel is to be used as a corn-popper, the knob 19 is turned out of the threaded opening 14 of the bushing in the lid and threaded into the bushing 41 at the free end of the crank 27. The arm 34 of the stirring rod 31 is then passed through the opening 14 of the bushing 15 in the lid. The curved portion 35 in the rod is moved through the opening 14 as shown in Fig. 4 to bring the shaft 31 into axial alignment with the vessel. The bearing member 21 is then threaded into the bushing 13 so that the collar thereon frictionally engages the flange 15 of the bushing 13 to prevent rotation thereof upon rotation of the crank 27 as later described. The rod is then allowed to drop through the bushing so that the bearing point 36 rests upon the bottom 3 of the vessel and the notch 39 of the weight 37 passes over the crank arm to connect the stirring rod with the crank as shown in Figs. 1 and 2.

The stirring mechanism should be applied to the lid prior to application of the lid to the vessel. This procedure is more convenient as the lid may be quickly spun onto the threads of the bearing member.

The corn to be popped is poured into the vessel and the lid replaced so that the arm of the stirring rod is in position to stir the grains of corn over the bottom of the vessel and prevent burning thereof during popping. When the curved portion of the rod is contacting the bottom of the vessel the weight connects the rod with the crank. During popping any steam or vapors that may rise within the vessel are free to pass off through the vent ports of the bearing member, the skirt portion of the weight acting as a shield to deflect the hot vapors downwardly and prevent injury to the hand of the operator. The weight being exposed, provides condensing surface for the vapors so that they are substantially condensed thereon and are dissipated without annoyance to the operator during the popping operation. The weight also conceals the bearing member and gives a streamlined appearance to the assembly.

From the foregoing it is obvious that I have provided a popcorn popper wherein the stirring mechanism is readily removed and the knob of the crank applied to the lid of the vessel so that the vessel may be used in the manner of an ordinary saucepan. It is also obvious that the stirring mechanism may be readily re-inserted when it is again desired to use the vessel as a popcorn popper. It is obvious that the curvature within the stirring rod facilitates insertion of the rod and also provides a substantially frictionless bearing on the bottom of the vessel so that there is no cutting, marring or wearing of the vessel bottom with the stirring mechanism in use.

It is also obvious that due to the sliding connection between the crank and the agitator shaft, the lid seats freely upon the shoulder of the vessel and turning of the crank does not raise, cock or roll the lid out of its position.

What I claim and desire to secure by Letters Patent is:

1. In a device of the character described including a vessel having a bottom and a lid for closing an open top of the vessel, a bearing member substantially in the axial center of the lid and having a counterbored axial opening, a shaft extending through said opening of the bearing member, said counterbore of the opening forming an annular passageway extending from the interior of the vessel part way through the bearing member, and having outlet through a port in the bearing member for venting the vessel, a crank rotatably supported by the bearing member, and a driving connection between the crank and the shaft.

2. In a device of the character described including a vessel having a bottom and a lid for closing an open top of the vessel, a bearing member substantially in the axial center of the lid and having a counterbored axial opening, a shaft extending through said opening of the bearing member, said counterbore of the opening forming an annular passageway extending from the interior of the vessel part way through the bearing member, and having outlet through a port in the bearing member, a crank rotatably supported by the bearing member, and a connector fixed to the shaft and having a skirt portion depending over the bearing member and provided with a notch for passing the crank to slidably connect the shaft with the crank.

3. In a device of the character described, a lid for closing an open top of a vessel, a bushing in the axial center of the lid and having an internally threaded opening, a bearing member having an externally threaded portion removably engaging the threads of the bushing, a shaft extending through the axial opening of the bearing member and having a laterally and upwardly curved lower end terminating in a laterally extending stirring arm, a crank rotatably supported on the bearing member, and a weight fixed to the shaft and having a skirt portion depending over the bearing member and provided with a notch for connecting the crank with the shaft.

4. In an apparatus of the character described, a lid for closing the open top of a vessel, a bearing member mounted in the axial center of the lid, a shaft extending through the bearing member of the vessel and terminating in a stirring arm adapted to sweep over the bottom of said vessel, a crank rotatably mounted on the bearing member, and a weight fixed to said shaft and having a skirt portion depending over the bearing member and provided with a notch for passing the arm and provide a driving connection between the crank and said shaft.

RALPH P. HUMPHREY.

REFERENCES CITED

The following references are of record in the file of this patent:

UNITED STATES PATENTS

| Number | Name | Date |
| --- | --- | --- |
| 1,178,171 | Meyer | Apr. 4, 1916 |
| 1,621,277 | Richman | Mar. 15, 1927 |
| 2,120,718 | Smith | June 14, 1938 |
| 2,146,372 | Ingraham | Feb. 7, 1939 |